United States Patent [19]

Hunt et al.

[11] 3,962,698
[45] June 8, 1976

[54] VISUAL DISPLAY AND REMOTE CONTROL PANEL SYSTEM
[75] Inventors: Don N. Hunt, West Jordan; Robert P. Anderson, Salt Lake City, both of Utah
[73] Assignee: Don N. Hunt, West Jordan, Utah
[22] Filed: Nov. 20, 1974
[21] Appl. No.: 525,378

[52] U.S. Cl.................... 340/286; 340/166 EL; 340/336; 340/324 M; 340/337; 340/166 R
[51] Int. Cl.²............................................ G08B 5/36
[58] Field of Search......... 340/286, 166 EL, 324 M, 340/166 R, 336, 337

[56] References Cited
UNITED STATES PATENTS

| | | | |
|---|---|---|---|
| 2,634,406 | 4/1953 | Jones | 340/286 |
| 2,904,626 | 9/1959 | Rajchman | 340/166 EL |
| 3,310,797 | 3/1967 | Auger | 340/286 |
| 3,665,455 | 5/1972 | Schmersal | 340/166 X |
| 3,750,103 | 7/1973 | Angus | 340/286 X |
| 3,781,802 | 12/1973 | Kafafian | 340/166 X |

*Primary Examiner*—Harold Pitts

[57] ABSTRACT

A remote control and display panel system suitable for eating establishments, for example, wherein the orders as to item and quantity per item, for a succession of customers, may be fed into a composite memory system and displayed on the display panel so that cook personnel may perceive the same. Information fed into the memory system is continuously strobed so as to supply a visually continuous read-out of such information on the display panel. Features are incorporated in the system to provide for accommodation to the use of a plurality of controls panels with one or more display panels; equipment is provided for clearing and ease of operation.

4 Claims, 5 Drawing Figures

VISUAL DISPLAY AND REMOTE CONTROL PANEL SYSTEM

The present invention relates to systems incorporating remote control panels and display panels electrically or electronically connected thereto and, more particularly, to a new and improved system wherein memory capability is provided such that a strobing of information will supply a visually continuous read-out on the display panel. Additional advantages are hereinafter set forth.

BACKGROUND OF INVENTION

In the past the customary procedure in eating establishments and particularly "fast food" installations and take-out establishments has been for a waitress to write a customer's order on a slip or simply call in an order to cook personnel. When verbal instructions are used confusion often results, in addition of course to general raising of the noise level at the establishment which is often objectionable to customers. The writing of orders on slips is time-consuming, much more so than were a simple push button system incorporated wherein a waitress can convey the necessary information to the cook in a convenient manner.

FIELD OF INVENTION

The criteria to be kept in mind in designing a suitable remote control board or control panel will be that it should be small in size, be easy to operate by the waitress, and usable for successive customers.

SUMMARY OF INVENTION

In one embodiment of the present invention, as is dislosed in the drawings, the control board includes three separate series of push button switches. A first series pertains to the customer and second and third series pertain to the item to be selected and the quantity of that item. Appropriate decals or writings may be placed opposite the item switches so that the user will know to which item, i.e. hamburger, cheeseburger, malt, and the like, that push button is related. The quantity-per-item keys are chosen to be physically separate from the customer keys and item keys and are depressed for the particular quantity of a particular item selected, shown in multiple-numeral light means as hereinafter described. In the present invention the customer key is always depressed first; subsequently either the item key or the quantity key for a particular item subsequently to be selected are depressed. The selection memory is strobed for visually continuous, plural customer selection display in the manner hereinafter set forth.

Suitable provision is made for clearing of the machine for subsequent use for a subsequent customer. Also, the entire machine may be cleared at the end of store hours for subsequent use the following day. It is to be noted that a subsequent resetting of the remote control board or panel will not alter a prior selection made for use by cook personnel.

Accordingly, a principal object of the present invention is to provide a new and improved remote control panel and display system.

A further object is to provide a remote control panel and display system incorporating a memory, such that the control panel may be subsequently actuated for a new set of circumstances without disturbing the display on the display-panel of a prior selection.

A further object is to provide a control panel and display system for eating establishments.

An addition object is to convey information electronically so that the same can be presented on a visual display or read-out, and with subsequent control board selection not interfering with prior inputs that are to persist.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF DRAWINGS

FIG. 4 is a plan view of a representative control board or control panel in a preferred embodiment of the invention, showing the groupings of customer, item, and quantity keys or push button switches.

FIG. 5 is a plan view in reduced scale of an LED lighted display panel.

Figure 2:
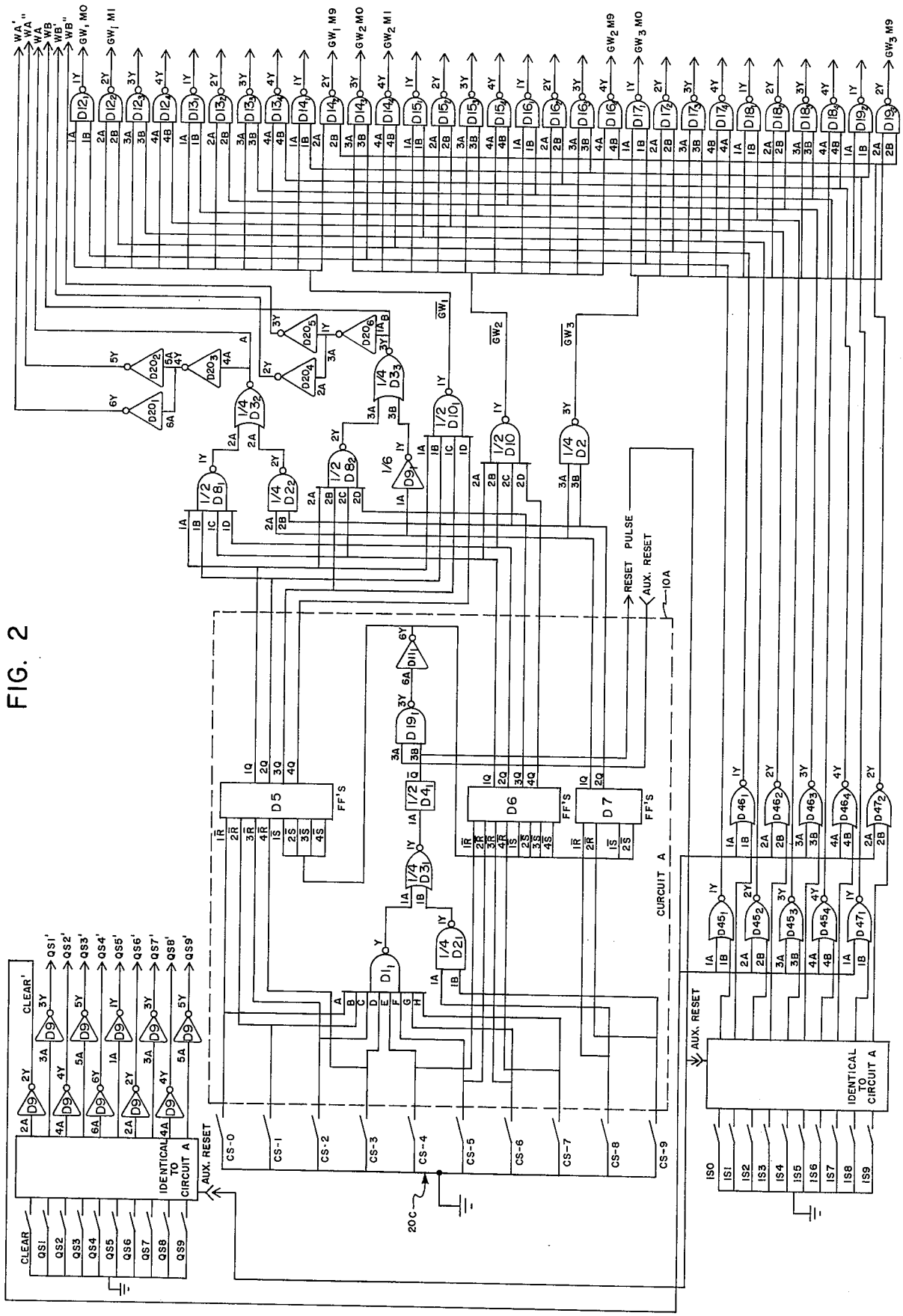
FIG. 2 is an electrical schematic of the details of the system of FIG. 1.
Figure 3:
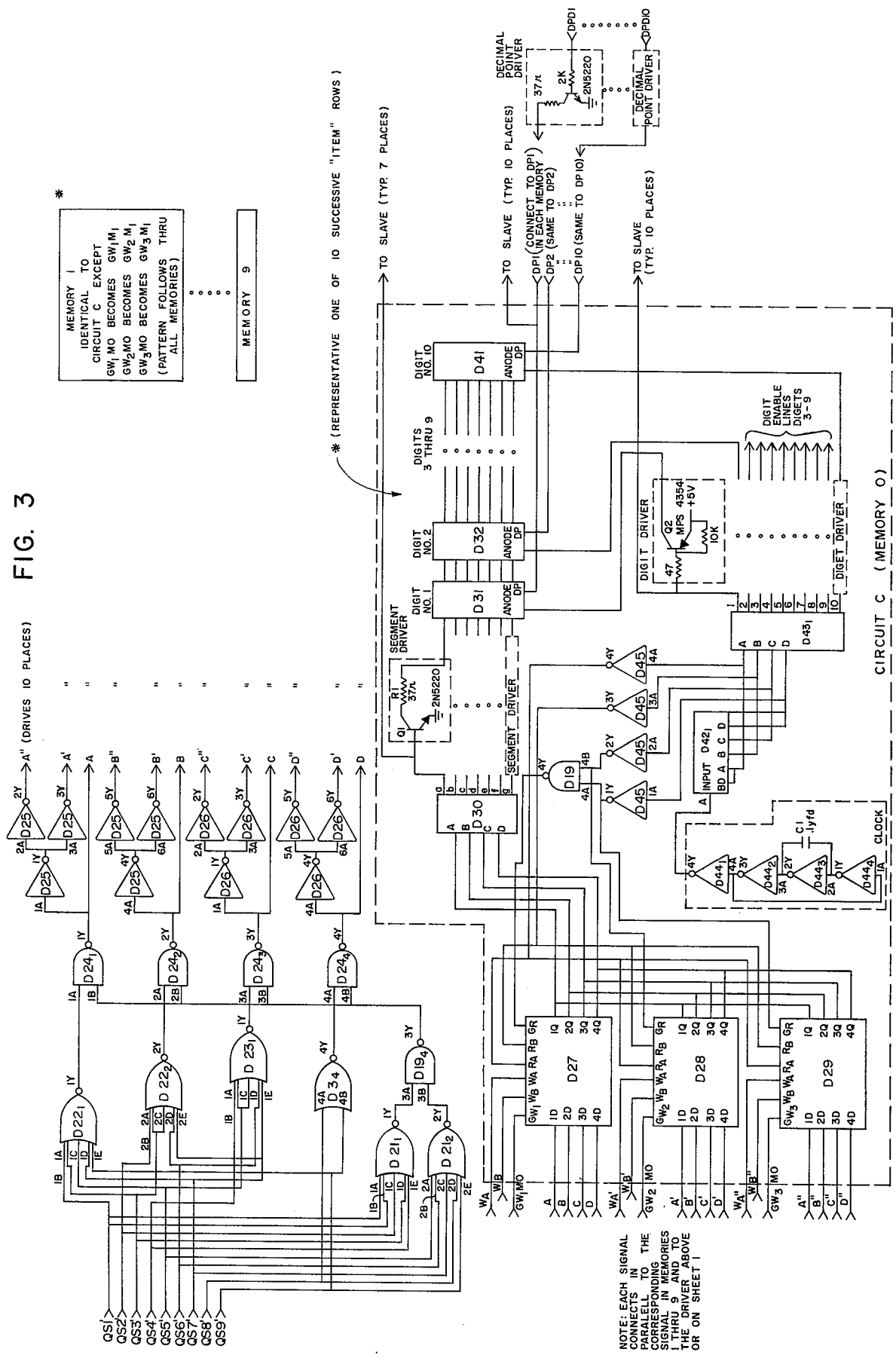
FIG. 3 is a continuation of the schematic of FIG. 2.

Merely by way of example, the following parts list is given, specifically identifying the conventional code designations or symbols of various parts and systems as found in the drawings, specifically FIGS. 2 and 3:

PARTS LIST

| Circuit Designation | Vendor and Part Number |
|---|---|
| CS0 thru CS9 | CLARE/PINDAR S820-10F7 push button key switches |
| IS 0–9 QS1-9, C, S | CLARE/PINDAR S820-10F7 push button key switches |
| D1 (1/1) | T1  7430 8 input positive nand gate |
| D2 (1/4 1/4) | 7400 quad 2 input positive nand |
| D3 (1/4 1/4 1/4 1/4) | 7402 quad 2 input positive nor |
| D4 (1/2) | 74123 dual monostable multivibrator |
| D5, D6, D7 | 74279 quad S-R latches |
| D8 (1/2 1/2) | 7420 dual four input positive nand |
| D9 (1/6) | 7404 hex inverter |
| D10 (1/2 1/2) | 7420 dual four input positive nand |
| D11 | 7404 hex inverter |
| D12–D19 | 7400 quad 2 input positive nand |
| D20 | 7404 hex inverter |
| D21, D22, D23 (1/2) | 74260 dual 5 input positive nor |
| D24 | 7400 quad 2 input positive nand |
| D25, D26 | 7404 hex inverter |
| D27, D28, D29 | 74170 4 × 4 register file |
| D30 | 7448 BCD to 7-segment decoder |

PARTS LIST -continued

| Circuit Designation | Vendor and Part Number | |
|---|---|---|
| R1–R7 | | 37n, 1/4 carbon resistor |
| Q1–Q7 | ZN | 5220 NPN transistor |
| D31–D41 | HP | 5082-7750 Seven-segment LED displays |
| D42 | | 7490 decade counter |
| D43 | | 7442 BCD to decimal decoder |
| D44 | | 7404 hex inverter |
| C1 | | .1 μfd 10V capacitor paper or ceramic |
| D45 | | 7404 hex inverter |
| Q2 | MPS | 4354 PNP transistor |
| D45, D46, D47 | | 7402 quad 2 input positive nor |

All parts above are manufactured by T (Texas Instruments Corporaton), except as noted. HP (Hewlett Packard), MPS (Motorola Corporation), Clare/Pindar

DESCRIPTION OF PREFERRED EMBODIMENTS

Figure 1:
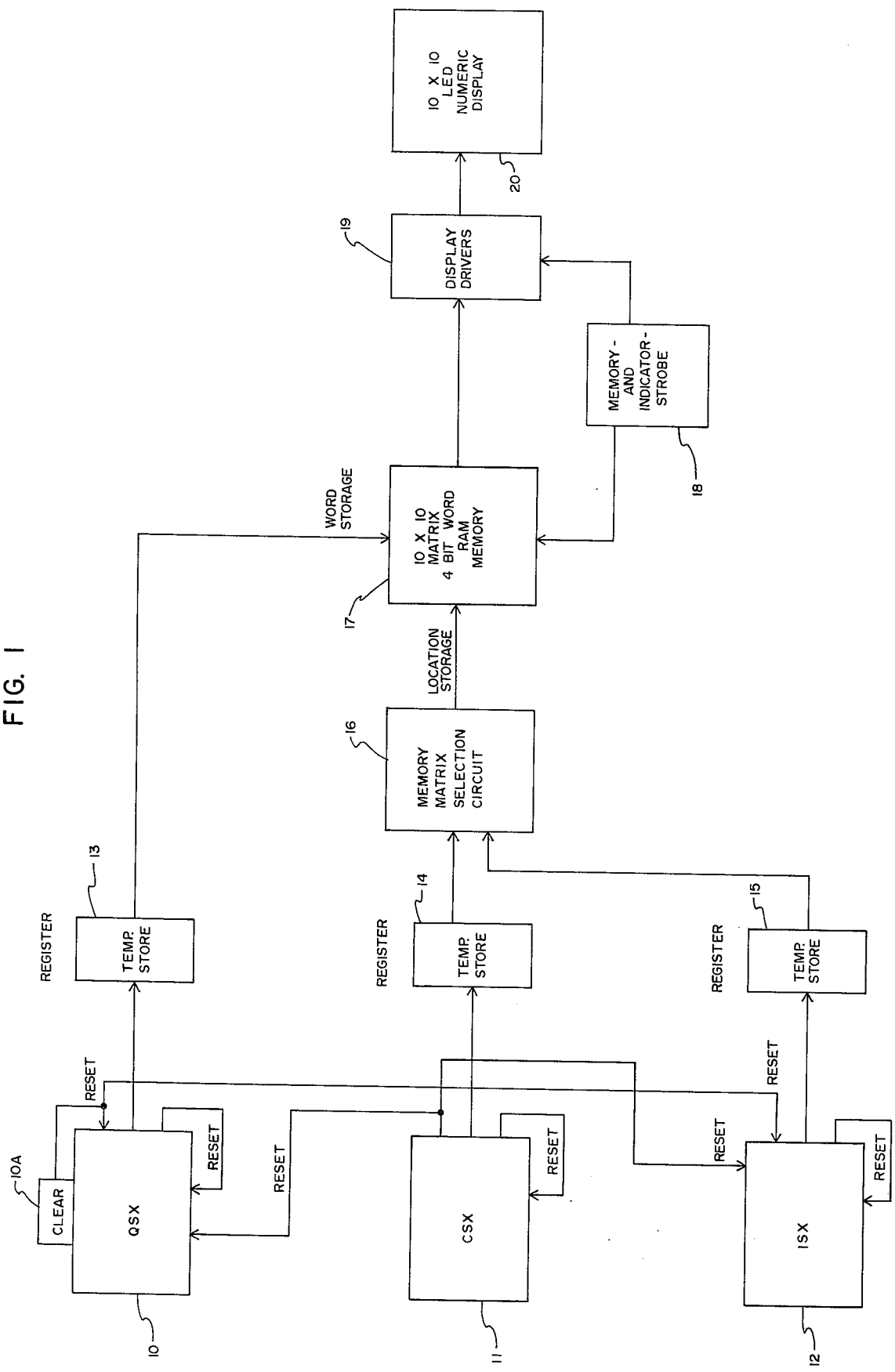
FIG. 1 is a block diagram of the over-all system of the preferred invention in a preferred embodiment thereof.

In FIG. 1 stages 10, 11 and 12 respectively comprise "quantity", "customer", and "item" stages, including the respective keys of FIG. 4 and associated circuitry, and are hereinafter referred to as QSX stage 10, CSX stage 11, and ISX stage 12, respectively. Temporary storage registers 13, 14, and 15 each individually comprise the composite of quad S̄-R̄ latches D5, D6, and D7 in FIG. 2. Stage 16 comprises a particular memory matrix selection circuit, and stage 17 comprises a particular 10 × 10 matrix 4 bit word RAM memory, "RAM" standing of course for "random access memory." Stage 18 comprises a memory- and indicator-strobe. These will be described hereinafter. Stage 19 comprises the display drivers, hereinafter to be described; and stage 20 comprises a 10 × 10 LED numeric display, "LED" referring to "light emitting diode".

Figures 4, 5:
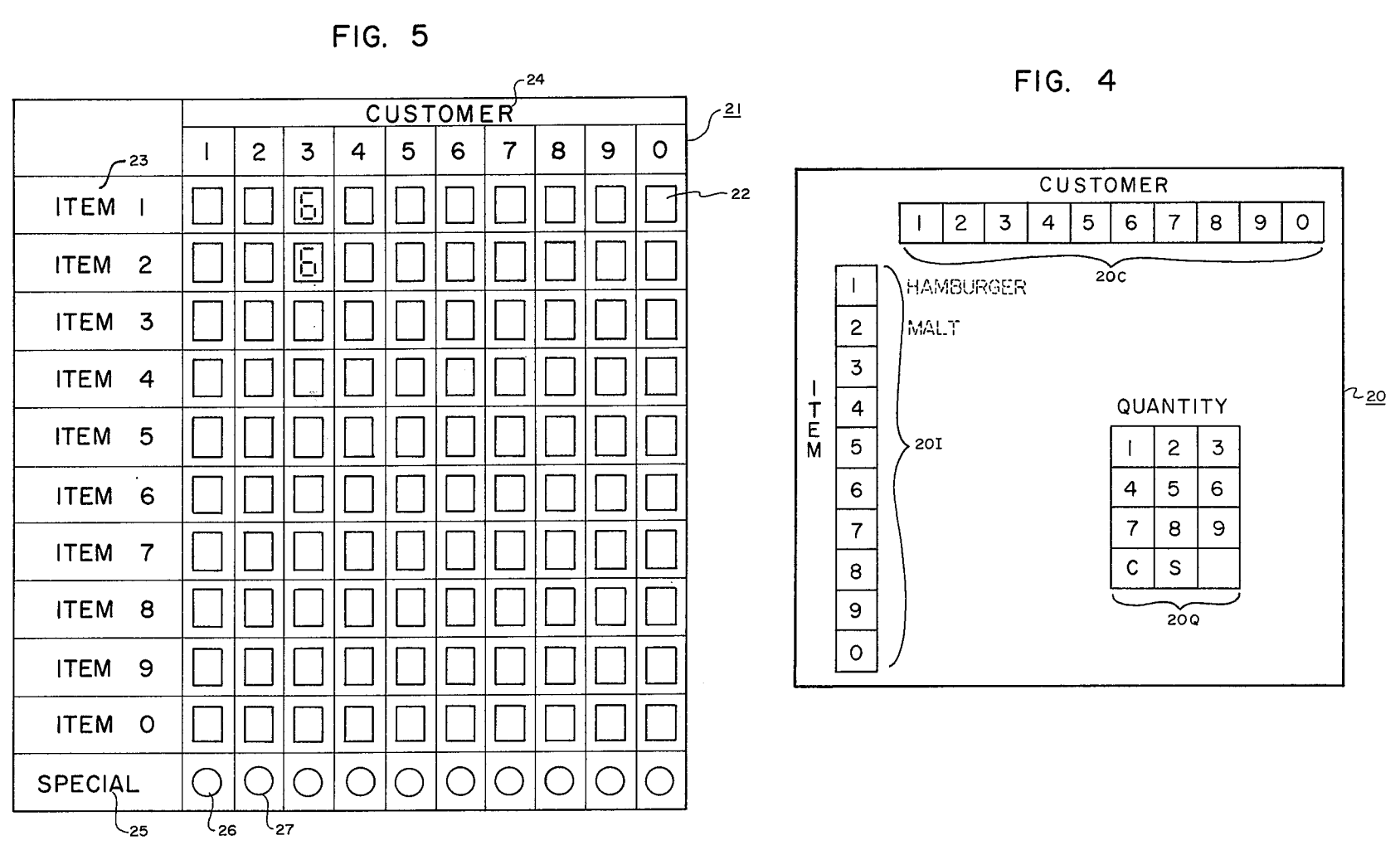

As to the physical embodiment so far as terminal equipment is concerned, FIG. 4 illustrates the general visual configuration of an information receiving panel or control board 20, the same having a series of actuatable push button switches or keys relating to "item", "customer", and "quantity." Each of the numbers on the respective squares indicate different push button switches in the respective push button sets 20C, 20Q and 20I.

In referring to FIG. 5, it is seen that the same illustrates a visual display panel 21.

Each of the elements 22 in FIG. 5 comprises a seven-segment LED changeable numeral display or indicator. A representative seven-segment LED display would be Hewlett Packard, part No. HP5082-7750. These are manufactured by the Hewlett Packard Corporation, and the same are designated as elements D31–D41 in FIG. 3. See the above parts table. Decals or other indicia as at 23, 24, and 25 indicate, respectively, a particular item, e.g. "hamburger," that may be ordered by a customer, the customer row 1-0, signifying customers No. 1 through No. 10, and special orders designated "special" at 25. If desired, individual lights at 26, 27, and so forth, may be used for special orders by respective customers 1–10, indicated by numerals 1–9 and 0 proximate the customer indicia 24. The lights 26, 27 and so forth may be lighted by simple toggle switch actuation, when provided, on the control board actuating the LED light switches to be installed in the "special" row.

A general description, by way of orientation, of the over-all system as above described is as follows. Reference is made specifically now to FIG. 1, FIG. 4 and FIG. 5. The following is a sample operation of the mechanism beginning with the customer key bank CSX, i.e. key set 20C. Depressing any one of the CSX keys causes the information generated, by depressing the key, to be temporarily stored in register 14; simultaneously, reset signals are sent out to reset all other keys in the QSX group of keys i.e. 20Q and all keys in the ISX, i.e. 20I group of keys. The information placed in the temporary storage register 14 is then routed to the memory matrix selection circuit 16. This information forms the abscissa of the matrix from the "customer" or the CSX keys. Depressing one of the ISX keys causes the information to be stored temporarily in register 15, at the same time resetting all other keys in the ISX matrix. This information from register 15 storage, is routed through the memory matrix selection circuit 16 to form the ordinate of the selection of the matrix. The two inputs from the two keys from the CSX keys and from the ISX keys then form the location of the matrix, both ordinate and abscissa. Pressing a QSX key causes the information from that switch or key to be stored in temporary register 13, at the same time resetting all other QSX switches. This information stored forms the word storage information, the 4 bit word storage, at the location determined by the CSX and the ISX switches. The information is then stored in the 10 × 10 RAM matrix 4 bit word memory 17 which now has the elements necessary, the location, and the word storage. This information is strobed by a conventional memory strobe; this is indicated by block 18. The memory is then strobed by a selected free-running multivibrator or oscillator controlled within the strobe circuitry. Simultaneously, the display drivers are strobed, see display drivers stage 19. The information having been strobed from memory is fed into the display drivers, and the display drivers in turn provide the necessary power drive for the 10 × 10 LED numeric display 20.

As a result of pressing the three sets of keys on the control board, the customer, quantity, and item keys on the display panel now indicate a light in the appropriate matrix location, showing the quantity desired and entered by the quantity keyboard.

Reference is now made to FIGS. 2 and 3. The parts list hereinabove made is given for the designated parts D1, D2 and so forth. The fractions ¼, ½ and so forth refer to the fact that certain portions of the integrated circuit B3, for example, are used in several separate locations. Thus, the ¼ indications merely are used for "bookkeeping" purposes and indicate how many ¼ portions of IC chip D3, for example, are being used in the circuit, and where.

The interconnection of parts, whether by separate wires or groups of wires, or whether by printed circuit board, are shown in FIGS. 2 and 3 in detail and will not be specifically enumerated. The general details of the interconnection of parts, however, will now be described as well as the detailed operation of the system as shown in FIGS. 2 and 3.

At the outset it will be appreciated that the best way the circuit can be understood is to consider one discrete condition, namely, when one of the "customer" keys, one of the "quantity" keys, and one of the "item" keys have been pressed. It will be noted that the customer key at group 20C will be depressed first; thereafter, either the quantity key or the item key may be next depressed followed by the remaining key. Thus, for a particular customer, a given item will be selected and a given quantity of that item. The best way of considering the circuit will be to consider the depression of a customer key, followed by an item key and then followed by a quantity key. A representative example is now given and the circuitry and its operation as to such unique depressions will be considered.

First of all we will depress a representative customer key on the control board at 20C, see FIG. 4, key 3. The signals described herein will be standard positive logic where a signal is either a 0 or "low" or a 1 or "high", a zero representing a voltage close to 0 volts or ground, and a high or 1 representing a signal in the neighborhood of 5 bolts DC. Depressing CSX key No. 3 causes a low to be fed to circuit $D1_1$. It will be noted that any key depressed will also feed a signal either to $D1_1$ or $D2_1$, the outputs of which are routed together to $D3_1$. Therefore, the sum of the output of D3, a low, appears when any CSX key is depressed.

The input to $D4_1$ from $D3_1$ is a low which appears whenever a CSX key is pressed. The negative-going edge of said low causes a negative pulse from one shot multivibrator $D4_1$ to be impressed on the input of $D19_1$ which is gated with the auxiliary reset input, giving an output through $D19_1$ through $D11_1$ into any of the three registers D5, D6, and D7. This resets all three of the above-mentioned registers. The negative-going pulse from the output of $D4_1$ is fed out as a reset pulse which is fed into the auxiliary reset of the QSX stage 10 and the auxiliary reset of the ISX stage 12. This causes an initial known reset condition not only in the CS register but also in the IS register and in the QS registers 13, 14, and 15.

Depressing key CSX No. 3 therefore produces the necessary reset pulse signals to set all three of the register banks at a known initial condition. In addition, the low produced by depressing CS-3 is fed into register D5 in the CS register. This causes a flipflop to be set since the reset pulse at the set lines was of a very short duration; the holding down of the key now stores the fact that CS-3 was depressed. The output in this case of D5 is 4Q which is low or 0. This low at 4Q is fed into $D10_1$. The output of $D10_1$ goes high when any CS key 0–3 is pressed.

We are now in portions of the memory matrix selection circuit. This output from $D10_1$, a high, enables gates $D12_1$, $D12_2$, $D12_3$, $D12_4$, $D13_1$, $D13_2$, $D13_3$, $D13_4$, $D14_1$, and $D14_2$. These gates are now in a ready position to receive the information to be processed through them by depressing one of the ISX switches. At the same time the output from the D5 register consists of three highs coming from 1Q, 2Q and 3Q. This information is fed into the encorder circuit consisting of $D8_1$, $D2_2$, $D3_2$, $D8_2$, $D9_1$, and $D3_3$. The information is thus encoded. The output of this encoded network is fed to a fan-out system consisting of $D20_1$–$D20_6$; the outputs are used then for the right address select lines of FIG. 3 in the memory circuit C which is one of the 10 memory banks identical to circuit C. The outputs are fanned out to al WA, WB, WA', WB', WA'', WB'' inputs to these ten memory banks, each memory bank consisting in the primary order of three 4 × 4 register files. The WA and the WB selection enables the location in the first memory bank corresponding to the column position customer 3.

We will now press one of the item switches IS No. 1. IS No. 1 in being pressed is part of a similar circuit labeled circuit A, FIG. 2, as in the case of the CS3 switch. The outputs are identical from all CS switches and are fed past gates $D45_1$ through $D45_4$, $D46_1$ through $D46_4$, $D47_1$ and $D47_2$. The output from pressing the ISX-1 switch is then passed through this gate which forms the other half of the enabled gate $D12_2$. The output of $D12_2$ is fed into $GW_1$ in one of the memory banks. This then forms the discrete selection, customer 3 row 1 having been selected.

The third and final item to be entered on the display is the number as represented by the illuminated light-emitting diode indicator display. For example, depressing QS-2 causes a similar signal to the described mentioned pressing CS3 and IS1 to go through a circuit identical to circuit A with the outputs being then fed by inversion to an encoder consisting og $D22_1$, $D22_2$, $D23_1$, and $D3_4$, see FIG. 3. It is to be noted also that any output from any of the Q switches which are pressed is fed to a summint circuit consisting of $D21_1$, $D21_2$, and $D19_4$, the output of which is fed into the four gates $D24_1$, $D24_2$, $D24_3$, and $D24_4$. This output is combined with the output of the encoder so that outputs A, B, C, and D, together with their fan-out outputs A', A'', B', B'', C', C'' and D', D'', are fed into 10 places each on the 10 memory banks as per label. This in turn forms the 4 bit word which defines the symbol to be displayed in the matrix location which was defined by the customer switch C and the item switch I. These inputs go on A, B, C, and D into the memory chips in FIG. 3.

The information now has been stored as the 4 bit word at the proper matrix location.

The data now stored in the memory banks giving the proper matrix location and word content is now ready to be strobed and displayed on the display. The circuit enabling it to do this will now be described.

The free-running pulse generator consisting of $D44_1$, $D44_2$, $D44_3$, $D44_4$, and capacitor C1 provide the basic timing circuit feeding into the decade counter $D42_1$. This circuitry is found in FIG. 3. Reference is also given to the memory and indicator strobe 18 in FIG. 1. The decade counter puts out a binary coded decimal signal A, B, C and D which in turn is fed to a binary coded decimal to decimal decoder $D43_1$. The decimal outputs from this chip in turn drive each of 10 digit drivers as per FIG. 3. These digit drivers are in turn connected to each of the seven-segment light emitting diode displays D31–D41. Each of these is addressed in sequence, stroved so that it is addressed in excess of 100 times per second. The outputs A and B from the decade counter D41 are fed also through inverters to select the RAM address 0-3 on each of the three 4 × 4 register files D27, D28, and D29. Outputs from decade counter D42₁, C and D, are fed through a decoder circuit to properly select D27, D28, and D29, the 4 × 4 register files of the memory.

As each of these memories is strobed in this manner with this circuitry, the proper corresponding digits are simultaneously strobed, the information is fed from the 4 × 4 register files through D30 which is a binary coded decimal to seven-segment decoder. The output of this seven-segment decoder is of such a form to properly drive the segment drivers which are fed to all of the 10 LED seven-segment display digits; thus the binary coded decimal numbers 0, 1, 2, 3, 4, 5, 6, 7, 8, and 9 are properly driven on the LED displays to display those numbers in a decimal system 0, 1, 2, 3, 4, 5, 6, 7, 8, and 9.

Thus we see that the information stored in each of the memory banks is accessed at the proper time by the strobing circuit to be fed into the proper display as this is being strobed so that all selection is done with the "customer" switch, the "item" switch and the "quantity" switch, so that the proper LED displays are lighted at the appropriate times.

The above was a sample of how a given quantity can be selected in a desired matrix of customer, item, and quantity for one combination of three switches. Similarly, any of the other selections might be made through similar circuitry for any customer and the item and the quantity for any customer, item, or quantity desired.

Consider a food establishment having simply a single display, see FIG. 5, and a single control board 20 as shown in FIG. 4. The waitress will take a particular customer's order, say customer No. 3, and in fact will press the number 3 button associated with switch group 20C in FIG. 4. Thereafter she will select the particular food item desired, as from Group 20I, and the quantity of that particular food item as per the group of switches at 20Q. Upon the selection there will appear an indication on the control panel, shown in plan in FIG. 5, and described in detail in FIGS. 2 and 3, such that the customer's order is actually presented on the display panel in FIG. 5. If desired, a slave display panel may be connected in tandem with that shown in FIG. 5 as indicated at the area of the upper righthand corner of FIG. 3. The numerals 1, 2, 3,–9 and 0 underneath "customer" in FIG. 5 may be simply either opaque or lighted. Conventional displays of these numbers may be individually lighted upon the individual pressing of a particular customer key at 20C in FIG. 4. Depressing the clear button or C, see 20Q, button in the quantity key bank has the following effect: It resets all QSX 20Q keys and resets all ISX keys 20I but not the CSX keys 20C. This means that if a customer is selected on the control board and an error is made as to item or quantity positions, by pressing the CSX button items and quantities may be reselected without reselecting the customer button. As power is initially turned on, the memory bank may come up in random memory states, causing diplays to show random numbers and various matrix locations. In order to clear the display, first any customer columns which do have these random numbers must be pushed, for example, column 1, and following this the C button in the quantity key grouping must be pressed. This will clear up any items or quantities in column 1. Subsequently column 2 with the C button must be pressed, and 3, and so forth, up through item 0. Thus the entire keyboard and the display would be cleared.

The scope of this invention is the following:

A highly visible remotely located display panel or panels is accessed by one or more control board or boards so as to enable remote entry of customer, item, and quantities to be relayed to a distant location. Simultaneous customer entries from 1 through 10, and items 1 through 10 and quantities 1 through 9 may be entered in any of the matrix locations described in the text.

One unique feature of the invention is electronic provision whereby a subsequence selection as to item and quantity for a given customer does not interfere with the display selected for prior customers. Provision is made, of course, for clearing each individual customer selection as well as for clearing the enter customer display board. The dislays are continuously strobed; hence, an essentially continuously illuminated board appears, the human eye of course integrating the light from each display light unit. Thus a simultaneous or optically continuous display is achieved.

The location of the push button switches for the various groupings of customer, quantity and item is not without significance. See FIG. 4. The same is correlated with the general layout of the display panel so that the user may very easily and very quickly select for a particular customer the items and quantities desired by such customer.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. An illuminatable display and control panel system including, in combination: a display panel having a matrix of lighting means for giving a visual indication and indicia means for identifying rows and columns of said matrix, said matrix comprising a series of individual, multi-numeral lighting devices; a control panel having plural series of finger-actuated, successively actuatable switch means for successively selecting particular numeral illumination of particular light means of said matrix; memory means for electronically storing information as derived from successive series of switch means selections; and means for strobing said memory means and coupled to said lighting means to provide a continuously visible display of said selections simultaneously.

2. The system of claim 1 wherein such combination is provided with means for clearing said display panel.

3. The system of claim 1 wherein said plural series of switch means of said control panel are arranged in separated groups, two of said groups corresponding to the ordinate and abscissa of said display panel matrix.

4. An electrically illuminated display panel and control board combination for eating establishments, including, in combination: a cook's display panel having a series of multi-numeral lights indicating customer, food item, and item quantity selection, and indicia so labelling said lights; a waitress' control panel having a series of actuatable switches indicating particular customer, item, and item-quantity selection, said switches having indicia identifying the same as to customer, item, and quantity selection; and means intercoupling said switches with said lights for presenting in a continuously visible display said lights as illuminated in correct numerals to reflect a series of prior successive switch groupings selection.

* * * * *